United States Patent [19]

Acheson

[11] Patent Number: 4,873,419

[45] Date of Patent: Oct. 10, 1989

[54] AUTOMATIC WELDING APPARATUS FOR WELD BUILD-UP AND METHOD OF ACHIEVING WELD BUILD-UP

[76] Inventor: Rees H. Acheson, Hill Rd., Alstead, N.H. 03602

[21] Appl. No.: 815,682

[22] Filed: Jan. 2, 1986

Related U.S. Application Data

[63] Continuation-in-part of Ser. No. 759,543, Jul. 26, 1985, abandoned, which is a continuation-in-part of Ser. No. 707,341, Mar. 10, 1985, abandoned.

[51] Int. Cl.⁴ ............................................. B23K 11/30
[52] U.S. Cl. .............................. 219/125.1; 219/137.9; 219/137.2
[58] Field of Search ................ 219/125.1, 125.11, 136, 219/137.2, 137.8, 137.9

[56] References Cited

U.S. PATENT DOCUMENTS

| | | | |
|---|---|---|---|
| 2,880,305 | 3/1959 | Baird | 219/137.31 |
| 3,248,515 | 4/1966 | Gorman et al. | 219/137.31 X |
| 3,815,807 | 6/1974 | Bartley | 219/125.11 X |
| 4,015,086 | 3/1977 | Thatcher | 219/125.11 X |
| 4,242,987 | 1/1981 | Bernard et al. | 219/76.1 X |
| 4,527,039 | 7/1985 | Füwesi | 219/76.14 |
| 4,550,235 | 10/1985 | Füwesi | 219/76.14 |

OTHER PUBLICATIONS

Bacha, F. T., "Welding of Small Diameter Deep—Drilled Holes in Copper–Nickel," *Welding Journal*, Jan. 1978.

*Primary Examiner*—Teresa J. Walberg
*Attorney, Agent, or Firm*—Fish & Richardson

[57] ABSTRACT

Apparatus for weld build-up on a surface of revolution consists of an elongated, rotatable assembly that supports, at one end, an electrical welding torch terminating in a nozzle, the rotatable assembly introducing electrical welding current, inert gas, and welding wire to the torch, and including an electrically conductive, hollow, metal drive spindle. The drive spindle applies driving motion and conducts electrical current for transmission to the torch, and the gas and welding wire pass through the spindle to the torch. Also, an electrically conductive carrier is mounted in a radially adjustable, electrically continuous, offset relationship to a conductive body joined to the end of a spindle, and a torch is held in electrically conductive relationship by the carrier, the electrically conductive body and carrier together defining a gas tight passage extending from the spindle to the torch, a connection cavity being defined at a motion interface between the carrier and the body to maintain gas flow continuity therebetween over their range of offset adjustment. A method for weld build up on a surface of revolution is also described.

7 Claims, 11 Drawing Sheets

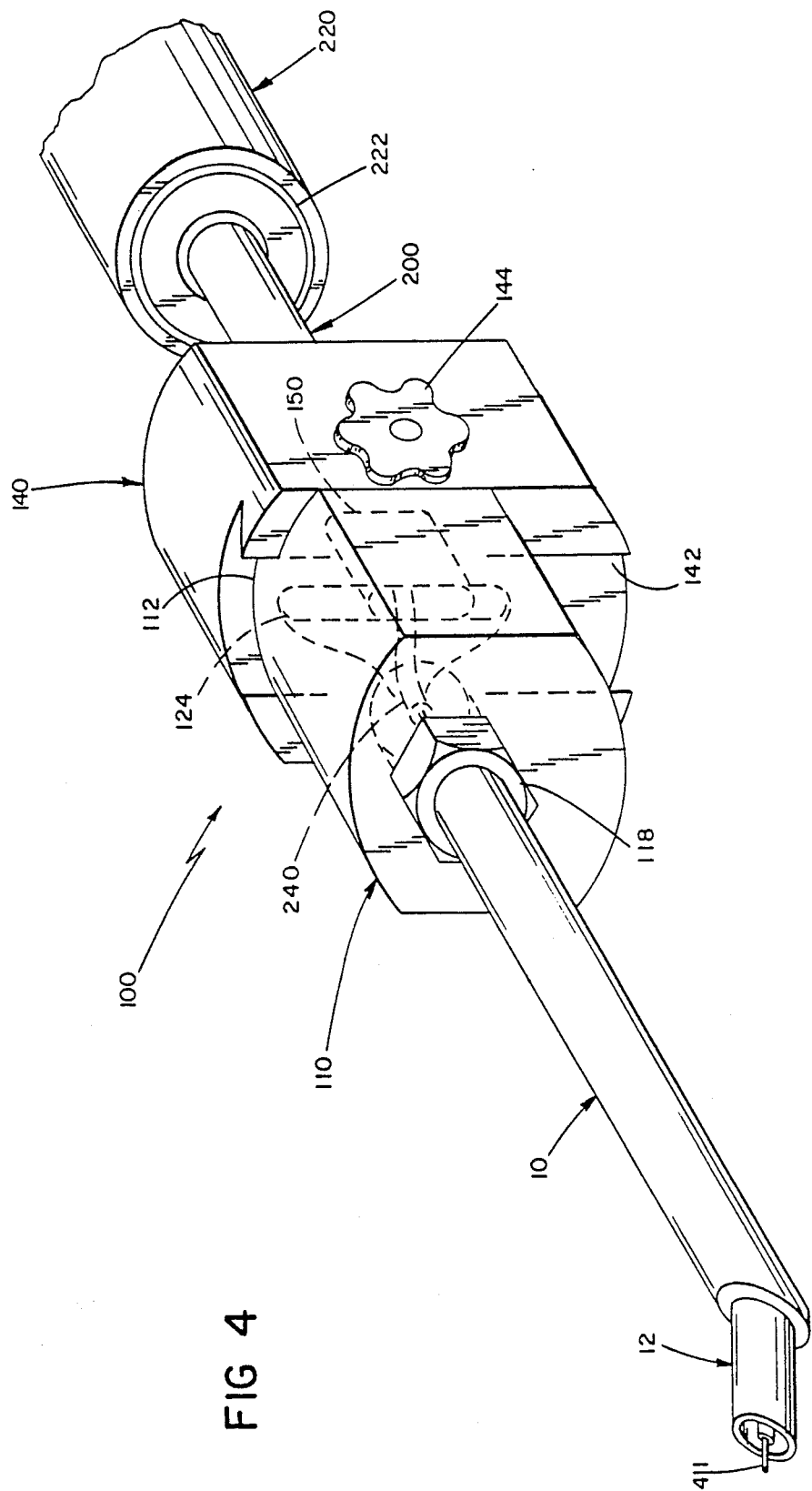

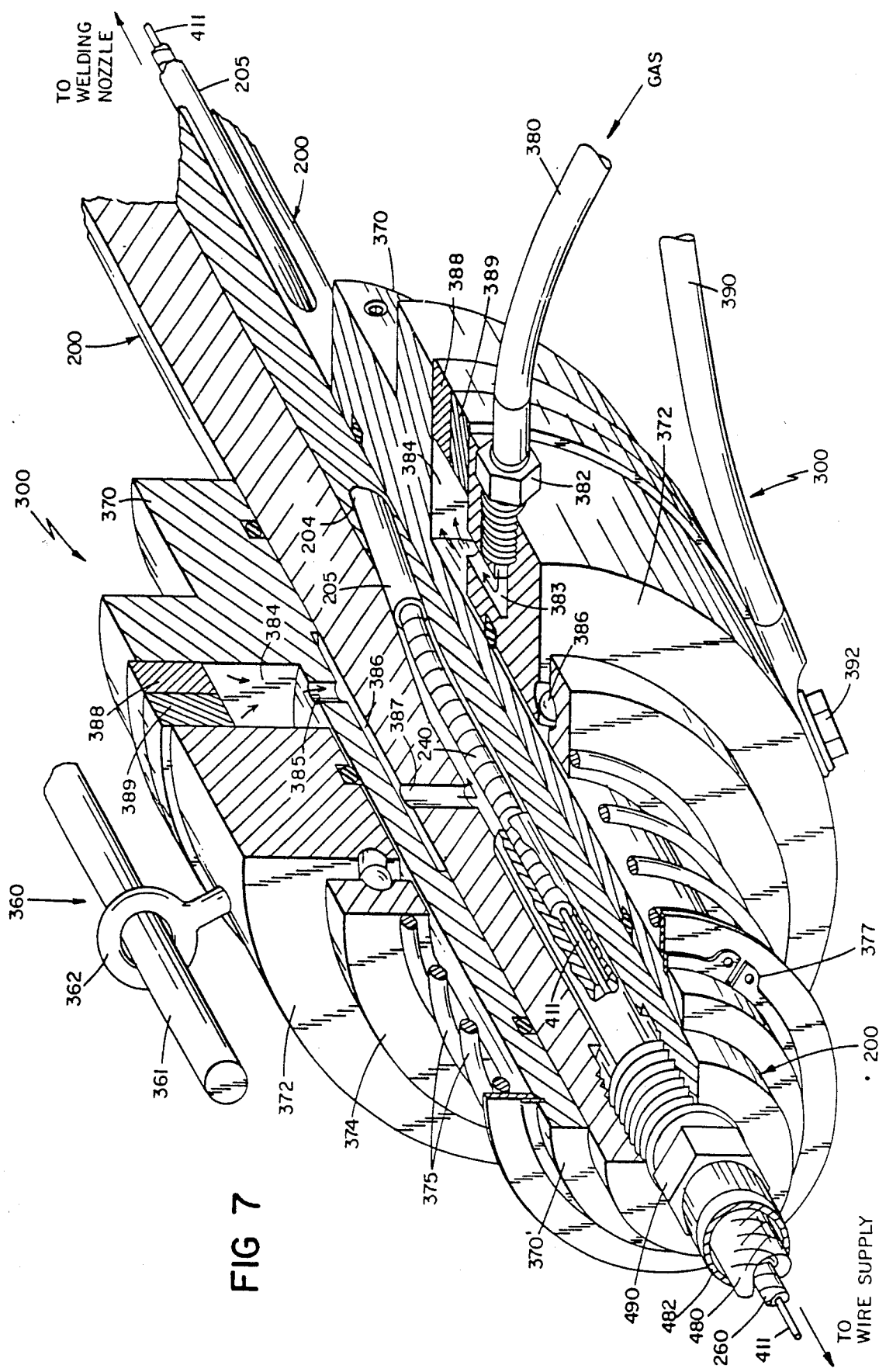

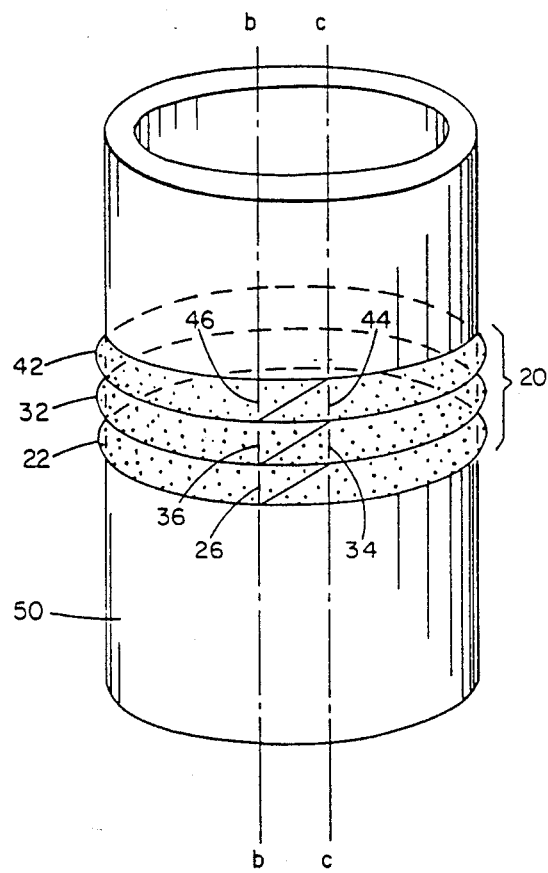

AUTOMATIC WELDING APPARATUS FOR WELD BUILD-UP AND METHOD OF ACHIEVING WELD BUILD-UP

This application is a continuation-in-part of my U.S. patent application Ser. No. 759,543 filed July 26, 1985, now abandoned which is in turn a continuation-in-part of my U.S. patent application Ser. No. 707,341 filed Mar. 1, 1985, now abandoned.

FIELD OF INVENTION

This invention relates to an automated welding apparatus for weld build-up and method of achieving the same. More particularly, it relates to a fully automated portable or stationary welding apparatus, using the MIG process (Metallic consumable electrode using Inert Gas), and method that is adapted to achieve circular welding on the bore surface or the outer surface of metallic objects arranged in various ways even where there is small free radial space in the immediate vicinity of the welding area

DESCRIPTION OF THE PRIOR ART

One application of prior art welding apparatus is the building up of the outside diameter of a shaft or the inside diameter of a bore. Weld build up of a shaft may be necessary where, for example, the shaft has been worn undersized in service, the shaft has been inadvertently undersized during manufacture, or the outer surface of the shaft must be hard surfaced for a particular application Weld build up of bores may be necessary where, for example, the bore has been worn oversize in service the bore has been inadvertently oversized during manufacture, or the inner diameter of the bore must be hard surfaced for particular application. In either case, the manner in which the welding apparatus achieves such build-up is similar. Illustratively, the welding apparatus fuses a layer of metal with an electric arc to the surface of the shaft or bore. Typically, the arc is initiated at some point on the surface of the shaft or bore to be welded and is moved around the circumference of the shaft or bore, depositing metal until the starting point is reached. At this time the arc is moved to a position contiguous to the deposited weld bead and again moved around the circumference of the shaft or bore for deposition of another weld bead. In this manner a layer of metal is fused to the surface of the shaft or bore with the length of the layer dictated by the number of weld beads deposited. One or more layers of metal can be fused to the surface of the shaft or bore depending upon the amount of weld build up required for a desired application.

With manually operated welding apparatus, the weld deposit operation is suspended at the completion of each 360° of rotation of the torch. This allows the operator to step-up the torch one weld deposit diameter to a position contiguous to the completed weld bead for the next circular weld. The suspension of the weld deposit operation during step-up of the torch head changes the operating parameters of the nozzle of the torch head and hence causes the physical characteristics of the weld deposit at the start of a contiguous weld circle to be of low quality in comparison to the weld deposit throughout the remainder of the weld circle. Such low quality welds are susceptible to stress failure as all the stress points caused by stopping and restarting cause a weak line all the way up the workpiece.

Automatic welding apparatus for effecting weld build-up about either the exterior or the bore surface of metallic objects are well known in the art. See, for example, U.S. Pat. Nos. 4,323,750 and 4,215,809, and certain automatic welding machinery that is marketed by Cecil Peck Company, of Cleveland, Ohio.

The apparatus described in U.S. Pat. No. 4,323,750 is specifically designed as a lining machine in which the workpiece rotates. It is made for typically large diameter pipe that is to be lined with another material as in lining a cylinder with stainless steel for corrosion resistance. In this machine the whole welding apparatus enters the pipe which is then rotated on rollers thereby dictating a large minimum diameter.

The apparatus described in U.S. Pat. No. 4,215,809 is specifically designed for build-up but it requires that the workpiece be of limited size and configuration as the apparatus is a lathe and rotates the workpiece while the welding head remains stationary. It would be difficult, for example to build up the I.D. of a crosshole in the end of a long structure with this apparatus.

Regarding the apparatus of The Cecil Peck Company, generally, such welding apparatus comprises a module equipped with all necessary mechanical and electrical components that is adapted to be rotated about the parts to be welded. Typically a standard commercially available MIG welding unit designed for linear welding is used in such apparatus. For radial adjustment the entire unit, consisting of the wire feed motor and gear reduction assembly and the wire feed rolls together with the torch head, gas hose and power cables plus the wire reel, must be offset and rotated, necessitating abundant clearances This entire unit must orbit the workpiece even when welding a small bore. The welding power source and control box are the only components of the welding system that are remotely located from the weld site.

In addition to the above prior art, U.S. Pat. No. 3,815,807 discloses a pipe welder made for joining two cylindrical objects and has no means for automatically stepping up to form contiguous beads for building up a surface. The machine can only effect one 360° weld and then must reverse rotation to disentangle power leads, gas hose and welding wire and is therefore difficult to be used as a build-up machine.

Prior art welding apparatus having mechanisms for stepping-up the torch head after each circular weld has been finished typically include additional controls. These controls are provided for varying such things as the angular position of the torch head to the weld site as well as varying the radius of the circle that the nozzle will travel.

With respect to weld build-up in general, it is impractical under different conditions to do build-up using the above described apparatus. Although acceptable for some applications, devices requiring rotation of the workpiece can only be used where space is sufficient for workpiece rotation. Also, some prior art devices have proved less than satisfactory due to lack of automatic step-up and the need for placement near the weld site of the cumbersome equipment necessary.

Also large, cumbersome items cannot always be moved to the welding machine; and with some items, their configurations do not allow reaching the area to be welded. In these cases, hand welding must be used even though automatic welding is always preferable over hand welding. When done by hand the weld cannot be applied evenly, one cannot be assured of voidless weld metal and heat cannot be distributed evenly, producing unpredictable warpage and shrinkage, and possibly cracks in the workpiece as well. Also, if the hole is too small or too deep, hand welding cannot be done in any case.

Most importantly, the above described automatic welding apparatus are not readily portable. Typically, they are of such enormity that they are affixed to a permanent work area. Even if they could be carried to the job site, they could not be mounted in proper operative position in a quick and efficient manner. Consequently, they are not readily adaptable for carrying out welding operations in the field. Their size also contributes to their cost which prohibits their use in a repair situation or field work, limiting them to production line use. In the prior art, field work is done by hand where possible or the workpiece is dismantled in order to bring a smaller section to the automatic welding apparatus in the permanent work area, a costly and time consuming task.

SUMMARY OF THE INVENTION

It is therefore an object of my invention to provide for a welding apparatus and method that may conveniently, accurately and cost effectively, weld inner or outer circular surfaces of comparatively small or large diameters in a continuous operation and to provide even, concentric welds. This is an advantage for instance, for build-up of worn cylindrical bearing surfaces, both inner and outer, for the repair of broken shafts and cylinders on unwieldy equipment, or for any other occasion requiring a circular, evenly applied, strong weld deposit.

According to the invention, the apparatus for the automatic welding of the metallic object broadly comprises a bore build-up unit and a remote wire feed device unit. The bore build-up unit of the present invention broadly comprises a rotatable spindle connected to a drive means and wire feed means and provided with a rotatable power connector, and an orbital welding torch, having a weld nozzle attached to it at one end. The other end of the torch is attached to the rotatable spindle through an offset adjustment means. The drive means rotates the spindle, the offset adjustment means and the torch in endless rotation such that the torch weld nozzle produces circular weldings on an inner bore surface or on an outer surface of a metallic object. The rotatable power connector is provided with a gas transmission means and an electrical power transmission means for guiding gas and electrical power from gas and electrical power conduits on to the rotatable spindle. A torque resisting means is provided for allowing endless rotation of the spindle without entanglement of the gas and electrified power conduits.

Additionally, the rotatable spindle, the offset adjustment means, and the orbital welding torch are each provided with wire transmission means, gas transmission means and electrical power transmission means for guiding wire, gas and electrical power from the rotatable spindle, through the offset adjustment means and the orbital welding torch and into communication with the nozzle at the end of the orbital welding torch. A control means can be connected to the rotatable spindle to position the spindle and hence orbital welding torch vertically with respect to the metallic object to be welded. In application, the apparatus is attached to a welding stand provided with means for receiving and holding the rotatable spindle. The welding stand can be portable or permanently affixed to a stationary object and can also be provided with means for receiving and holding an object to be welded. The remote wire feed device unit of the present invention communicates with the rotatable spindle and the orbital welding torch through a torsionally rigid flexible shaft.

According to a preferred embodiment of the bore build-up unit of the present invention, the rotatable spindle comprises a slender rod, inserted with a flexible conduit liner extending the length of the rotatable spindle through a hole drilled axially through its center. The flexible conduit liner guides welding wire, and hence provides wire transmission means for the spindle. A cavity formed by the space between the flexible conduit liner and the bore of the rotatable spindle allows passage of gas, and hence provides gas transmission means. In addition, the slender rod of the rotatable spindle acts as an electrical conduit, and hence provides the electrical power transmission means for the spindle.

The rotating means for rotating the spindle in endless rotation includes a drive sprocket bored to fit loosely over the rotatable power connector. The space caused by the loose fit is filled with epoxy which both electrically isolates and secures the sprocket to the rotatable power connector. Illustratively, rotation of a motor shaft and its driving sprocket, connected to the drive sprocket on the power connector through a chain, causes the drive sprocket and hence the rotatable power connector to rotate. The connector, in turn, being secured to the rotatable spindle, causes the rotatable spindle to turn in endless rotation.

The orbital welding torch comprises inner and outer metal tubes and is provided at both ends with drilled plugs. The plug at a first end of the orbital welding torch is machined to fit a coupling socket on the offset adjustment means while the plug at the second end of the torch is machined to fit a diffuser such as a standard MIG diffuser which holds a contact tip and a weld nozzle. A loosely fitting liner extending along the inside surface of the inner tube guides welding wire through the orbital welding torch from the first end of the torch to the diffuser and hence provides wire transmission means. Additionally, a cavity formed between the inner tube and the liner, allows passage of gas from the first end of the orbital welding torch to the diffuser and hence provide gas transmission means. Both tubes conduct electrical power and hence provide electrical power transmission means. Rotation of the rotatable spindle rotates the orbital welding torch, the orbit of the weld nozzle of the torch defining circular weldings on a bore surface or an outer surface of a metallic object.

Torches of different lengths can be made as dictated by the range of different depths of holes to be welded. Additionally, torches can be made for ranges of diameters extending the radius beyond that permitted by the offset adjustment means. These torches are easily changed in under two minutes and allow for a variety of workpieces to be welded.

The offset adjustment means is positioned between and connects the rotatable spindle and the orbital welding torch. It comprises a body member connected to the spindle and a sliding torch holder connected to the welding torch. Each member is provided with a cavity for gas and wire transmission means. Furthermore, the body member and sliding torch holder provide the offset adjustment means with electrical power transmission means. In the preferred embodiment, the body member and torch holder are fitted to one another by a dovetail connection which allows the torch holder to slide in a radial direction in the body member. They can be fitted to one another using other connecting means. The offset adjustment means is provided with means for making this offset motion and for preventing such motion once a desired offset position of the torch holder to the body member is reached. Since in operation the body member of the offset adjustment means is connected to the rotatable spindle and the torch holder is connected to the orbital welding torch, any offset of the torch holder to the body member determines the radius that the orbital welding torch is to be rotated and hence the radius of the circle to be welded.

The rotatable power connector in the preferred embodiment comprises two housings which are held in sliding contact by a spring. The housings are slipped over the end of the rotatable spindle with one housing fixedly attached to the spindle. Attached to the other housing are a gas feed hose and an electrical power line. Inert gas travels through the gas hose, through enclosures within the housings, which collectively form gas transmission means, and into a cavity between the flexible conduit liner and the bore of the rottable spindle for communication with the orbital welding torch. Although the gas transmission means previously described dictates the route taken by the gas through the rotatable power connector, other gas transmission means could be substituted. Electric power from the power line travels through the housings, the rotatable spindle, the offset adjustment means, the orbital welding torch and to the weld nozzle. The construction of the housings dictates the route taken by the electrical power through the rotatable power connector and hence provides the rotatable power connector with electrical power transmission means, although other power transmission means could be substituted. Because the housing to which the gas hose and power cable are connected is prevented from rotating by a torque resisting means, the rotatable power connector allows the rotatable spindle and hence the orbital welding torch of the welding apparatus to rotate endlessly, without entanglement of the gas hose and power cable. Importantly, the rotating power connector being slipped over the end of the rotatable spindle leaves the end of said spindle free for entrance of the welding wire on center. Thus, the welding wire has no inclination to tangle.

The remote wire feed device unit of the present invention comprises generally a wire reel, a wire feed rotatable spindle, a wire feed motor, a slip ring assembly, a wire feed roll assembly, a torsionally rigid hollow flexible shaft and a mounting platform The wire feed roll draws welding wire from the wire reel through the wire feed rotatable spindle, the wire feed roll assembly and the hollow flexible shaft. This shaft in turn directs the wire into the free end of the rotatable spindle for communication with the orbital welding torch The rotation of the wire feed device is produced by rotating the wire feed rotatable spindle This rotates the entire unit, including the wire reel and the supply of wire on the reel, about the axis or the rotatable spindle and thus about the axis of the wire passing therethrough. This rotation is synchronized with the rotation of the orbital welding torch by way of a synchronizing means, typically the torsionally rigid hollow flexible shaft which is driven from the bore build-up unit through the rotatable spindle Alternatively, the synchronizing means can be a gear train interconnecting the rotatable spindle of the bore build-up unit to the rotatable spindle of the wire feed unit. In this case the hollow flexible shaft need not be torsionally rigid.

In an alternative embodiment of the remote wire feed unit of the present invention, rotation of the wire is eliminated so that when the wire is fed through the welding spindle and out of the welding nozzle, it will only be moving axially, even though the welding nozzle is rotating. With the elimination of wire rotation, the support means for the wire reel and the wire feed means for axially feeding the wire through the apparatus are fixed against rotation.

With wire being fed from a supply reel, the unwound wire has an inherent tendency to curve. For example, if section of wire is unwound from the reel and cut into a finite length, it will assume a curved configuration. This phenomenon tends to cause the wire exiting from the welding nozzle to turn or twist erratically if the wire is rotated in the manner employed with the above-mentioned prior art devices. Also, when the wire is held against rotation, it still has this tendency of producing erratic movement. There is frictional contact of the wire with the internal wall surfaces of the welding nozzle and the direction of curve in the non-rotating wire relative to the direction in which the nozzle is pointing is always changing as the nozzle rotates about the workpiece.

In order to eliminate erratic movement of the non-rotating wire as it exits from the welding nozzle, a wire straightening mechanism is provided. The wire is fed through this mechanism after it is drawn off of the supply by the feed mechanism and is straightened into a relaxed linear configuration. In other words, after passing through the wire straightening mechanism, the wire no longer has a tendency to retain the curved configuration which was induced into it in connection with its formation and winding on the supply reel.

The bore build-up unit, if a portable model, further comprises a welding stand which forms a base. This welding stand can be secured to a work site by magnetic or other means and is easily adapted to any mounting scheme desired. The welding stand can be secured at any angle necessary for alignment with the axis of the metallic object since the welding apparatus operates at any angle. When portable, the bore build-up unit, (attached to the workpiece), and the wire feed device, (typically placed on the floor), comprise two separate units linked to one another by the hollow flexible shaft.

The bore build-up unit can also be constructed as a permanently affixed model mounted on a positioner, i.e. a radial arm or whatever the situation demands. In the case of a permanent installation it would no longer be necessary to have a mounting platform holding the wire feed device unit; rather it could be incorporated with the bore build-up unit on the positioner.

The bore build-up unit of the present invention is used with control means which in the preferred embodiment includes a quill positioner device comprising a housing which may be in the shape of a quill and a step up motor with gearing. The quill forms a through cavity for the rotatable spindle and is provided at its ends with bearings for holding the rotatable spindle, allowing it to rotate about its axis inside the quill. The outside surface of the quill is provided with a gear rack connected to gear means for transferring the quill, and hence the rotatable spindle, in an axial direction. During set up on a workpiece, manual operation of electrical circuit switches can rapidly move the quill vertically up and down in the quill positioner, thereby providing axial adjustment of the orbital welding torch for positioning relative to the weld site.

In addition, during welding operation electrical signals from a remotely located control panel, automatically activate the step-up motor which moves the quill axially for each revolution of the rotatable spindle to shift the weld depositing position of the nozzle of the orbital welding torch as required for step-up welding. At the same time this panel controls all other functions, (wire feed, welding power, gas, rotation, etc.) during the entire welding procedure, thereby making it a continuous operation until the end of the welding task.

The above combination of features makes it possible to extend the present field of application of automatic welding apparatus by minimizing the space and weight requirements. Consequently the apparatus is adaptable for use in welding applications where there is small free space in the immediate vicinity of the welding area. It is readily portable and hence adaptable for carrying out welding operations in the field as well. Due to its small size it is a relatively inexpensive tool to manufacture and thus be affordable to a broad range of businesses.

A preferred method of welding circular weldings on a bore surface or an outer surface of a metallic workpiece comprises the steps of continuously rotating the orbital welding torch in a circular path in an amount equal to about 360° around the surface to a limit point while at the same time continuously feeding welding wire and electrical power to the torch to form a substantially circular weld bead on the surface. At the completion of this weld, the torch is stepped in an axial direction perpendicular to the circular path for a distance equal substantially to the width of the circular weld bead. During this stepping, rotation of the torch and feeding of the welding wire and electrical power to the torch is continued. After step-up, the orbital welding torch continues its rotation in the next circular path in an amount slightly less than 360° around the surface to a limit point while at the same time feeding of the welding wire and electrical power is continued. The latter step is repeated as desired and finally, the first step is repeated as a final step. With this method there are no discontinuities in the welding operation at the point of step-up. Hence, a continuous weld is effected which is of uniform high quality throughout.

With this method of welding, the wire supply is either rotated about the axis of the wire continuously during the successive steps of the method; or alternatively, it is held fixed against rotation and straightened into a relaxed linear configuration. In either case, the welding will proceed with the wire exiting from the welding nozzle in a uniform predetermined manner.

BRIEF DESCRIPTION OF THE DRAWINGS

FIG. 4 is an enlarged view of an offset adjustment means as used in the unit of FIG. 1 showing slots for passage of welding wire and gas;

FIG. 5a cross-sectional view taken along lines 5e—5e of FIG. 5d;

FIG. 7 is an enlarged perspective cross-sectional view of the rotatable power connector of FIG. 3;

FIG. 8a is an enlarged cross-sectional view of a part of FIG. 8 showing the slip-ring construction for supplying electrical power to the wire feed device of the embodiment shown in FIG. 8;

FIG. 9 is a view of a weld layer comprising circular weld beads along the outer surface of a workpiece;

FIG. 10 is a view, partially broken away, of the torsionally rigid hollow flexible shaft of the present invention;

FIG. 11 is a side view, partially broken away, of the torsionally rigid shaft and casing assembly of the present invention;

FIG. 12 is a side view of an alternative embodiment of the remote wire feed unit of the present invention;

FIG. 13 is an exploded view of the coupling of the wire feed unit of FIG. 12 to the welding spindle of the apparatus; and FIG. 14 is a schematic view of the welding nozzle showing the path of movement of the welding wire therethrough.

DETAILED DESCRIPTION OF THE PREFERRED EMBODIMENT

Figure 1:
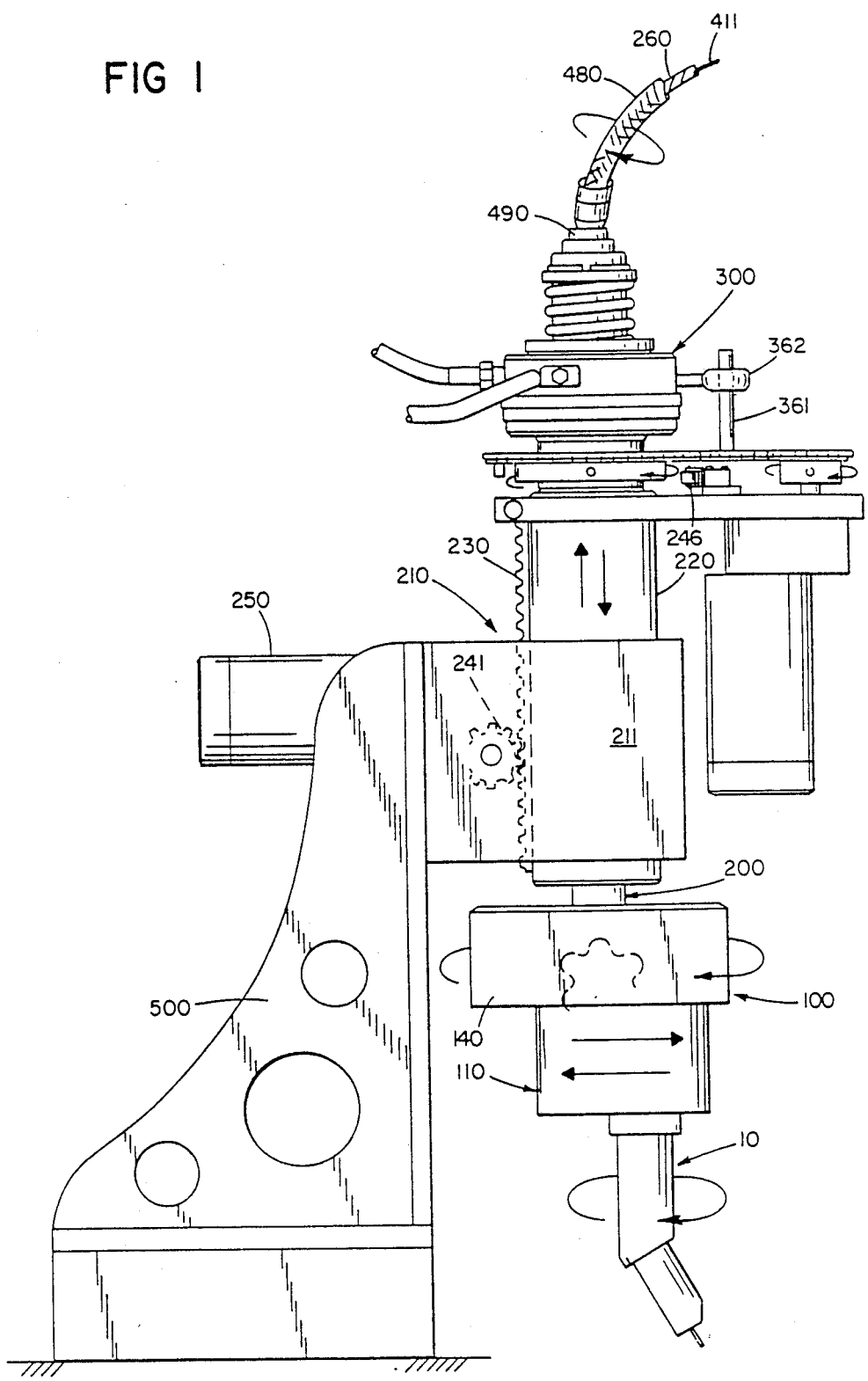
FIG. 1 is a side view of the bore build-up unit of the portable welding apparatus of the present invention as it is mounted to a welding stand with magnetic base.
Figure 2:
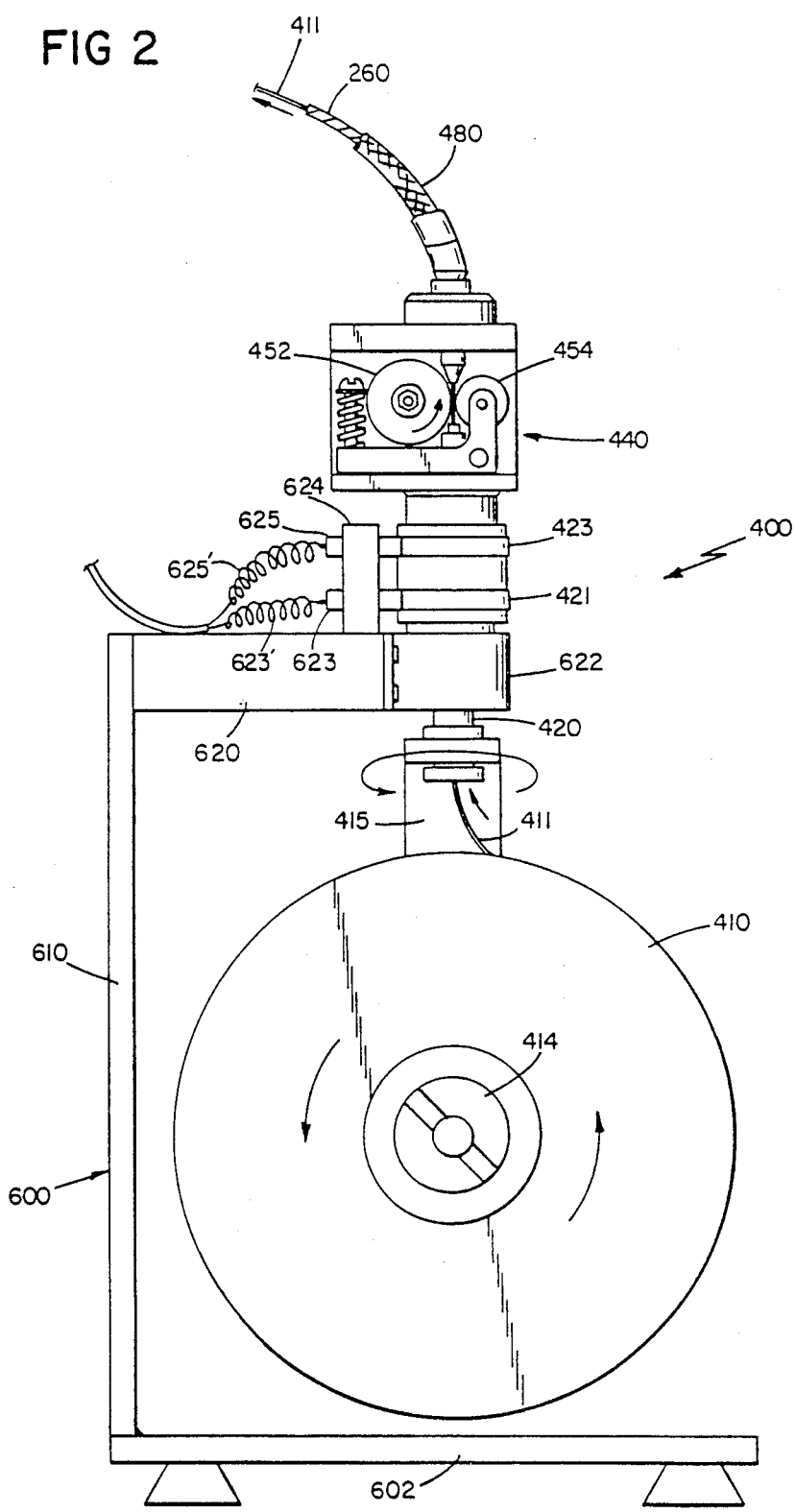
FIG. 2 is a side view of the remote wire feed device of the welding apparatus of the present invention as it is mounted to a platform and which may be used with the unit of FIG. 1.
Figure 3:
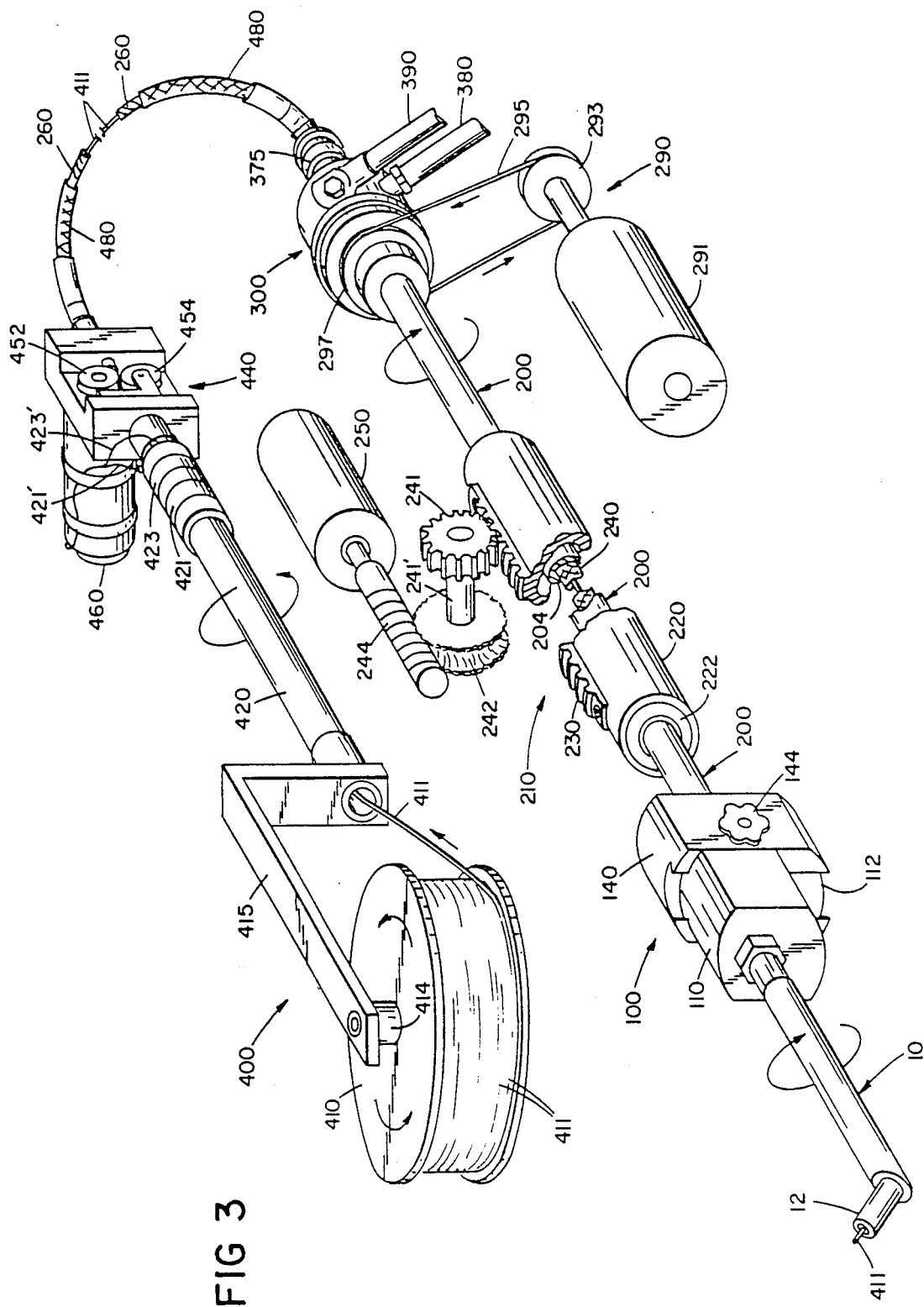
FIG. 3 is a diagrammatic view of a portion of the welding apparatus of the present invention.

FIGS. 1, 2 and 3 show a preferred embodiment of the welding apparatus of the present invention.

As shown in FIGS. 1 and 3, a bore build-up unit of the welding apparatus of the present invention comprises a rotatable spindle 200 connected at one end to a rotating means 290 via a rotatable power connector 300. An orbital welding torch 10 is connected at the other end of the spindle 200 through an offset adjustment means 100. A quill positioner 210 is also connected to the rotatable spindle 200 to control its axial movement.

Figure 6A:
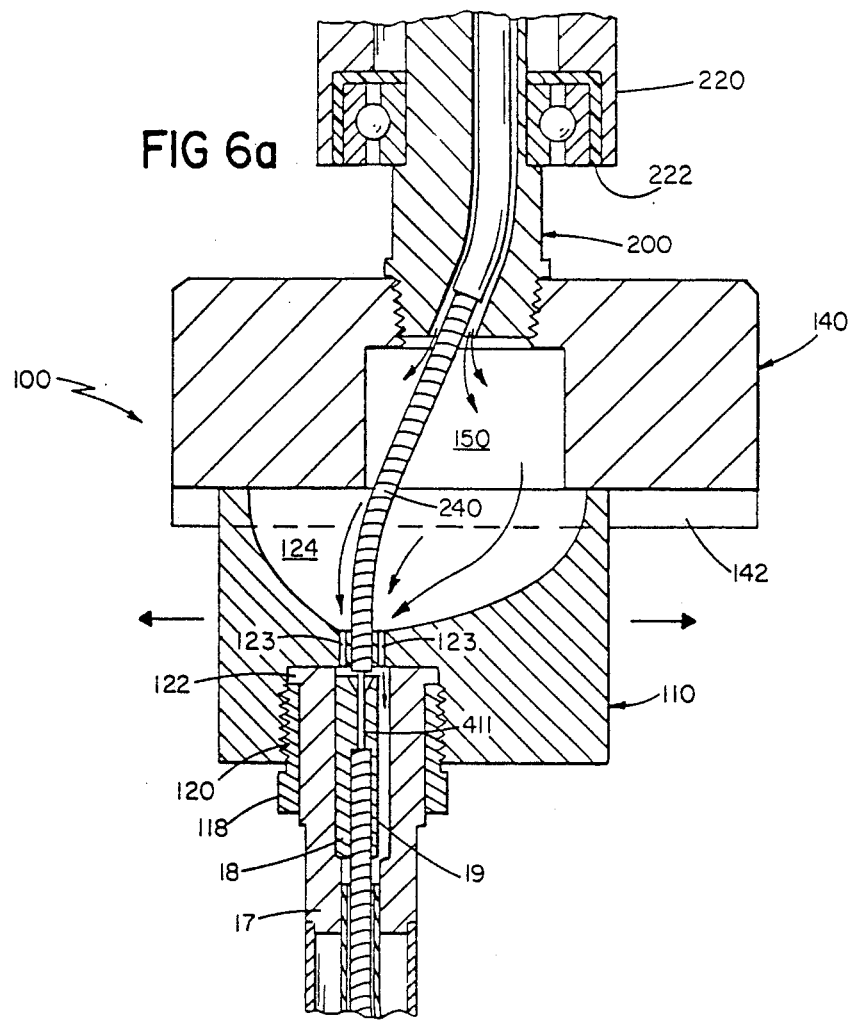
FIG. 6 an enlarged cross-sectional view of the orbital welding torch connected to the offset adjustment means of FIG. 3.
FIG. 6b is a side view of a further embodiment of welding torch of the present invention designed for large bores and for welding outer surfaces of workpieces.

As is shown more clearly in FIG. 3, rotatable spindle 200 comprises a metal rod with a longitudinally extending enclosed passage in the form of a hole or bore 204 axially drilled through its center. The rotatable spindle is slipped through the center of rotatable power connector 300, and on through quill 220 of quill positioner 210, and is attached to the body of the offset adjustment means 100 by a thread connection 148 (FIG. 6a).

The hole through the rotatable spindle is large enough to allow a piece of flexible conduit liner 240 to be pushed the entire length of the spindle for communication with offset adjustment means 100. The clearance between the outside of the conduit liner 240 and the bore of the rotatable spindle is great enough for passage of inert gas, supplied from conduit 380 at the power connector 300 (FIG. 7), to communicate with the orbital welding torch 10. The clearance provides the rotatable spindle with gas transmission means.

In another embodiment, the passageway through the rotatable spindle is made to allow a piece of steel tubing to be inserted in the central portion of the spindle to extend the entire length of the spindle 200 from the power connector into communication with the offset adjustment means 100. The use of a separate tube is also advantageous where the length of the spindle is too long for center boring. Here, the major length of the spindle is constructed with a groove 204' extending along its surface meeting angled holes at each end of the spindle. Thus, the tube in this embodiment provides the enclosed passage along the spindle. The flexible conduit liner 240 is then pushed the entire length of the steel tubing with the clearance between the outside of the conduit liner and the inside of the steel tubing allowing for passage of the inert gas to communicate with the orbital welding torch.

In either embodiment, the flexible conduit liner has a diameter large enough to receive and hold welding wire 411 and hence provides the rotatable spindle with wire transmission means. In this regard, welding wire 411 is pushed from wire feed device 400 by the feed rolls, 452 and 454, through a conduit liner 260 of the hollow flexible shaft 480, into flexible conduit liner 240 within rotatable spindle 200 and on into offset adjustment means 100 for communication with the orbital welding torch 10.

Inert gas, through conduit 380, and electrical welding power, through conduit 390, enter the spindle 200 through rotatable power connector 300. The rotatable spindle 200 carries the inert gas and welding power to the offset adjustment means for communication with the orbital welding torch.

Referring further to FIG. 3, rotating means 290 comprises sprockets 293, 297, a chain 295 and a drive motor 291. Sprocket 297 is a conventional drive sprocket bored to fit loosely over the rotatable housing part of power connector 300. The space is filled with epoxy which both electrically isolates and secures sprocket 297 to rotatable power connector 300. Rotation of drive motor 291 rotates driving sprocket 293 and driven sprocket 297 through chain 295. Rotation of driven sprocket 297 causes the rotatable power connector to rotate, which being secured to the rotatable spindle, as more fully described below, causes the rotatable spindle to rotate in endless rotation.

As shown in FIGS. 4 and 6a, offset adjustment means 100, comprising body member 140 and sliding torch holder 110, connects the orbital welding torch 10 to the rotatable spindle 200. The body member and sliding torch holder each have an internal cavity and each have openings at two ends. The cavities provide the offset adjustment means with gas and welding wire transmission means and the body of the offset adjustment means provide the offset adjustment means with electrical power transmission means. The body member and torch holder of the offset adjustment means member are fitted to one another by a dovetail 112 which allows the torch holder to slide in a radial direction in the body member. The body member is provided with a hand knob 144 connected to means internal (FIGS. 5b and 5d) in the body member for this purpose. Advantageously, when orbital welding torch 10 is attached to torch holder 110, and the rotatable spindle is attached to body member 140, any radial sliding motion of the torch holder to the body member permits the axial position of the orbital welding torch to be offset in relation to the axial position of the rotatable spindle. This offset of the torch holder to the body member determines the radius of the orbital welding torch and hence the radius of the circle to be welded.

Figure 5A:
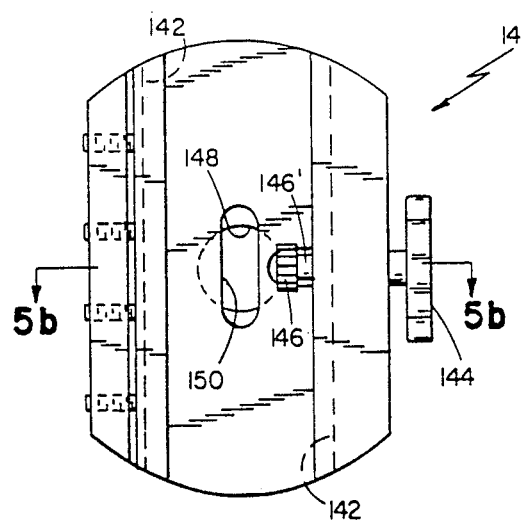
FIG. 5a is a bottom view of the body member of the offset adjustment means shown in FIG. 4.
Figure 5B:
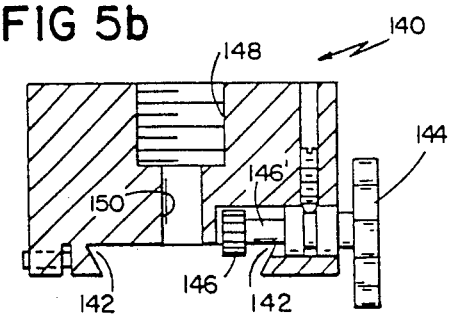
FIG. 5b is a cross-sectional view taken along lines 5b–5b of FIG. 5a; assembled adjustment means shown in FIG. 4.
Figure 5D:
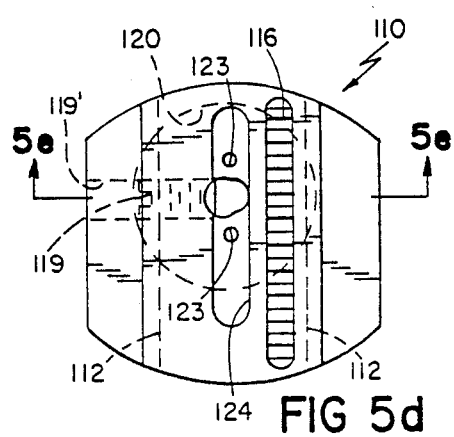
FIG. 5d is a top view of the torch holder of the offset adjustment means shown in FIG. 4.
Figure 5E:
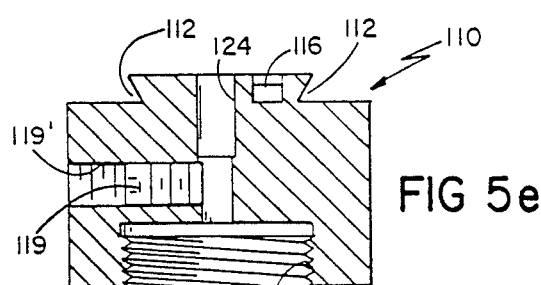
FIG. 5c is a side cross-sectional view of the assembled adjustment means shown in FIG. 4.
Figure 5C:
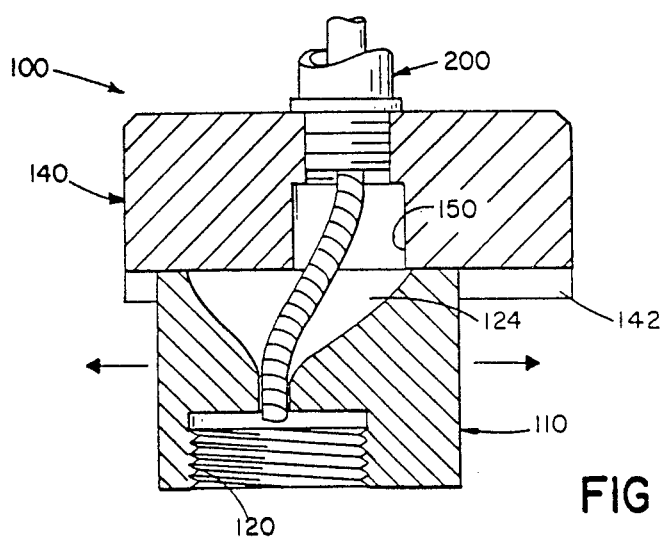

The means internal to the offset adjustment means member for moving the torch holder relative to the body member is shown in FIGS. 5a–5e, with 5a and 5b showing the body member 140 and FIGS. 5d and 5e showing the torch holder 110. The body member is provided with a recessed dovetail 142 in order to engage dovetail 112 of the torch holder when the two are fitted to one another (FIG. 5c). In the body member is a pinion 146 which mates with a rack 116 in the torch holder. Turning of a hand knob 144 connected to the pinion, via a pinion shaft 146,, forces the dovetail of the torch holder to slide in the recessed dovetail of the body holder. The top of the body member also has a threaded hole 148 to engage screw threads on the bottom end of the rotatable spindle (FIG. 6a). The bottom of the sliding torch holder also has a threaded hole 120 to allow connection of the orbital welding torch. The torch is held in place by an externally threaded bushing 118, pressing against a small flange 122, shown in FIG. 6a, at the wire receiving end of the torch 10.

As shown in FIGS. 4, 5a, 5b and 5c, the body member 140 and sliding torch holder 110 of the offset adjustment means are provided with slots 150 and 124 respectively. These slots provide openings or passageways for passing the flexible conduit liner 240 from the rotatable spindle through the offset adjustment means and to the orbital welding torch. These slots are milled within the central section of the members parallel with the dovetails. The width of the slots is larger than the diameter of the flexible conduit liner 240 in order to loosely receive this liner. In addition, these slots are sufficiently long to permit the torch holder to move relative to the body member without damaging the flexible conduit liner 240 containing welding wire as the liner snakes its way from the rotatable spindle to the torch. The flexible liner provides the offset adjustment means with wire transmission means. Gas also passes through these slots 124, 150. Therefore, the sliding surfaces of the dovetail of the body member and torch holder are closely fit in order to prevent gas leakage.

Referring to FIG. 5e, a set screw 119 is provided in a threaded hole 119' in the torch holder in order to secure the end of the flexible conduit liner 240 to the holder and in communication with the end of the torch to be connected to the threaded hole 120 of the holder. The bottom of the slot 124 is reamed at the connection of the liner 240 to permit gas to pass through the slot. Also, holes 123 are provided for passage of gas. See also FIG. 6a.

FIG. 6a shows a cross-sectional view of the orbital welding torch 10 comprising an inner and outer tube, 15 and 16, respectively, and weld nozzle 12, all as attached to offset adjustment means member 100. Inner tube 15 is pushed into the outer tube 16 at one end and is provided at opposite ends with drilled plugs, 17 and 17a. These plugs are welded to the outer tube. Plug 17 at the receiving end of the torch is machined to fit into the threaded hole 120 of the torch holder 110 of the offset adjustment means member 100. The second plug 17a is machined to fit a diffuser 22 such as a standard MIG diffuser to hold contact tip 24 within weld nozzle 12.

A flexible conduit liner 21, with a transitional fitting 18 attached to one end, is inserted through drilled plug 17 and on into inner tube 15. This conduit receives the welding wire 411 and hence provides the torch with wire transmission means. The transitional fitting has two ducts, one of which is shown at 19, milled along two sides of the cylindrical fitting. These ducts together with the inner tube 15 defines a longitudinally extending enclosed passage through the torch to provide gas transmission means for the torch. These ducts allow passage of inert gas from holes 123 and slot 124 of the torch holder 110 of the offset adjustment means member 100 to the space between liner 21 and inner tube 15 of the orbital welding torch. The body of the torch provides the torch with electrical power transmission means.

Figure 6B:
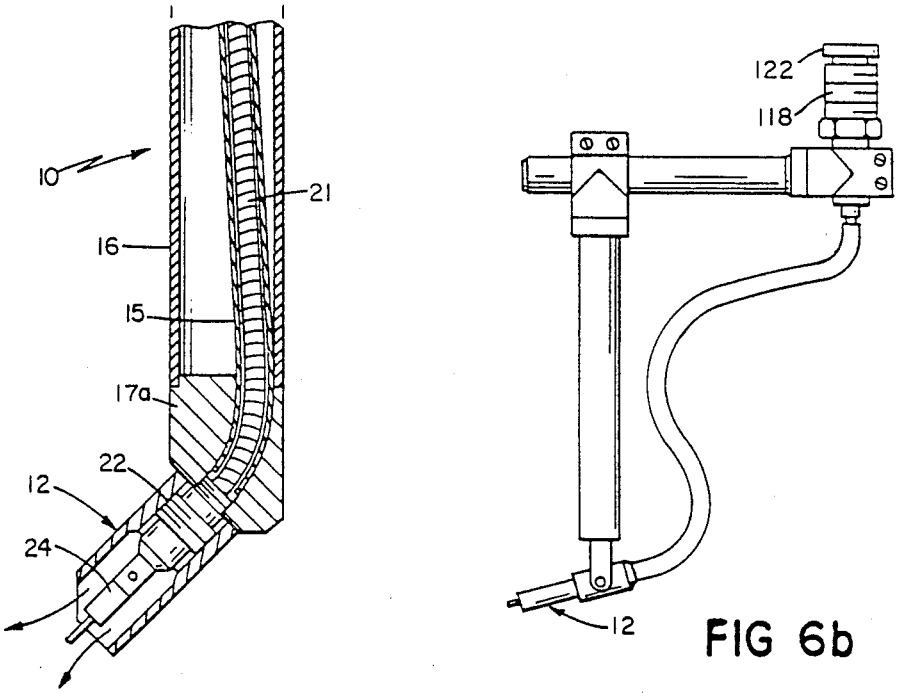

FIG. 6b shows an extension torch for lengthening the radius which the torch can weld. The nozzle 12 can also be pivoted inward to weld the outside of a boss, shaft or the outer circumference of a metallic object. This illustrates the versatility of the machine. Torches of different lengths can be made as dictated by the range of different depths of holes to be welded. Additionally, torches can be made for ranges of diameters extending the radius beyond that of the offset adjustment means. These torches are easily changed in under two minutes and allow for variations of workpieces to be welded.

Referring now to FIG. 7, the rotatable power connector 300 provides a gas connection between an inert gas source (not shown) and the rotatable spindle and also transfers electrical power to the rotatable spindle and to the welding nozzle of the orbital welding torch at the weld site As shown in FIG. 7, the rotatable power connector comprises first and second bronze washers, 388 and 389, respectively, a rotatable housing 370, and another housing 372 preferably also made of solid bronze. The first bronze washer 388 is silver soldered to the rotatable housing 370. The second washer is silver soldered to housing 372 and both this washer and its attached housing are slipped over a stem portion 370, of rotatable housing 370 so that the second washer lies contiguous to the first washer.

The second washer 389 and housing 372 are held in sliding contact with the first washer 388 and rotatable housing 370 by a spring 375 through a ball thrust bearing 374. As shown in FIG. 7, metal spring 375 holds thrust bearing 374 against housing 372 thereby forcing bronze washers 388 and 389 into sliding contact insuring good electrical transfer. A snap ring 377 maintains spring pressure. Current from a power source (not shown) is fed to the rotatable power connector via the electrical power cable or conduit 390. Current then passes to the rotatable spindle and the orbital welding torch connected thereto. The metal construction of the housing parts of the power connector provide the electrical power transmission means for the rotatable power connector. Current enters rotatable power connector 300 through attachment of the cable 390 by bolt 392 to the outer surface of housing 372. This current flows through power connector housing 372 to bronze washer 389 and then to housing 370 by way of the sliding contact with bronze washer 388. Finally, the current passes to the rotatable spindle 200 to which housing 370 is fixed.

Still referring to FIG. 7, inert gas enters the rotatable spindle through crosshole 387 in the rotatable spindle shaft. Inert gas gets to crosshole 387 in the following manner. Inert gas in gas conduit 380 enters into housing 372 of rotatable power connector 300 by way of fitting 382. The gas is guided through crosshole 383 to hollow chamber 384, then through crosshole 385 to hollow chamber 386, and from there into crosshole 387 which leads to the cavity formed between flexible conduit liner 240 and the wall surface of the bore 204 of the rotatable spindle. This network provides the rotatable power connector with gas transmission means.

Housing 372 is prevented from rotating by torque resisting means 360 comprising eye screw 362 attached to the outer surface of the housing 372 and adapted to receive and hold a torque resisting bar 361 which is non-conductively attached to a stationary platform (FIG. 1). Any turning movement of the housing 372 is resisted by the torque resisting bar.

Because housing 372 to which gas conduit 380 and power cable 390 are connected is prevented from rotating by the torque resisting device 360, the rotatable power connector 300 allows the spindle 200 to rotate endlessly without entanglement of gas hose and power cable. Importantly, the configuration of the rotatable power connector allows the end of the spindle leading to the wire supply (lower left hand end in FIG. 7) to be left free for entrance of welding wire on center, eliminating problems with the wire twisting.

Referring again to FIG. 3, the welding control means for axially positioning the weld beads is provided by the quill positioner 210 comprising a housing or quill 220, and a step-up motor 250. As shown in FIG. 3 the ends of quill 220 are provided with bearings 222 for receiving and rotatably holding rotatable spindle 200 against relative axial movement. The quill forms a through cavity for holding the rotatable spindle 200, allowing it to rotate about its axis inside the quill when driven by rotating means 290.

The outside surface of the quill is provided with a rack 230 for transferring the quill and hence rotatable spindle 200 in an axial direction. As shown in FIG. 3, rack 230 is in mesh with pinion gear 241 which is secured, via shaft 241,, to a worm gear 242. The worm gear in turn is in mesh with a worm 244 mounted on the shaft of step-up motor 250. As shown in FIG. 1, a trip pin 245, fixed to the rotating sprocket 297, trips switch 246 upon each revolution of the spindle 200 to actuate step-up motor 250.

During operation of the welding apparatus, operation of step-up motor 250 automatically moves quill 220 with rotatable spindle 200 up or down in the housing support structure 211 of the quill positioner 210. The housing support structure is secured to the welding stand 500, shown in FIG. 1. This motorized shifting of the quill and hence the rotatable spindle 200 repositions the orbital welding torch to a new effective weld depositing position as required for step-up welding.

A control panel (not shown) controls step-up motor 250 as well as rotating means 290 and wire feed motor 460. With respect to providing step-up welding to a metallic object according to a preferred method of the present invention, the step-up motor is activated after each 360 of rotation of the spindle 200 and torch 10 by the limit switch 246 which is tripped by the pin 245 connected to the rotatable spindle. The distance of step-up is determined by control panel, pre-set by the operator, to switch on the step-up motor for a specific time interval and speed. Upon activation, the step-up motor causes the rotating rotatable spindle 200 in quill 220 and the attached orbital welding torch 10 to vertically climb by way of the rack 230 until the orbital welding torch is in a position contiguous to the just completed weld bead. During the climb of the rotating rotatable spindle, the control panel continues to maintain all other functions (wire feed, welding power, gas, rotation, etc.) thereby making the welding a continuous operation until the end of the welding task.

Referring to FIGS. 2 and 3, the remote wire feed unit 400 of the present invention comprises wire reel 410, wire feed rotatable spindle 420, wire feed roll assembly 440, a torsionally rigid hollow flexible shaft 480, and a mounting platform 600. Mounting platform 600 includes a base plate 602, an upright 610 and a horizontal plate 620. Horizontal plate 620 is provided with an electrically isolated bearing block 622 for receiving and holding wire rotatable spindle 420. The wire rotatable spindle is rotatably suspended from horizontal plate 620 by bearing block 622.

The wire reel 410 is wound with welding wire electrode 411 and mounted on rotatable support bar 414, which is attached to one end of bracket 415. The wire reel rotates about the axis of the support bar as wire is payed out and fed to the welding unit. Wire feed rotatable spindle 420 is fixedly attached at the one end of bracket 415. By this connection of wire feed rotatable spindle to the wire reel, any rotation of the wire feed rotatable spindle causes bracket 415 to orbit or rotate about the axis of the wire feed rotatable spindle 420 and the wire 411 being fed therethrough. This forces the wire reel to rotate perpendicularly to its own axis and in line with the axis of the wire feed rotatable spindle.

The wire feed rotatable spindle is secured at the end opposite the bracket 415 to a wire feed roll assembly 440 which is similar to a conventional unit. The wire feed roll assembly includes a wire feed motor 460 (a gear reduction motor) which is drivingly connected to wire feed drive roll 452. A pressure roll 454 presses welding wire against feed drive roll 452. Thus the drive roll grips the wire, draws it from the reel and pushes it into the hollow flexible shaft 480 for communication with the orbital welding torch.

Because wire feed rotatable spindle 420 is rotating, power must be supplied to wire feed motor 460 through slip rings 421 and 42. The slip rings are cast in epoxy along with connecting wires 421, and 423, The assembly is bored to fit the wire feed rotatable spindle and machined to expose the slip rings on the outside diameter. The slip rings are connected by way of the connecting wires 421' and 423' to the electrical leads of the wire feed motor 460. The slip ring assembly is pressed onto the wire feed rotatable spindle 420 below the wire feed roll assembly 440 in such a manner that the slip rings are in sliding contact with carbon brushes 623 and 625 (FIG. 2) mounted on a vertical support member 624 protruding from the midsection of the horizontal plate 620. The carbon brushes are fixedly connected to electrical wires 623', 625' that are connected to a power control box (not shown). Power applied to the carbon brushes passes to the slip rings and is thus applied to the wire feed motor 460.

The rotation of the wire feed device 400 is synchronized with the rotation of the orbital welding torch 10 by way of synchronizing means such as the torsionally rigid hollow flexible shaft 480. This shaft is fixed at one end to the wire feed roll assembly 440 and is driven from the bore build-up unit by its connection, at its other end, to the rotatable spindle 200. As shown at the lower left hand end of FIG. 7, this latter connection is effected by the threaded connector 490 secured in the threaded end of the spindle 200. With this connection of the torsionally rigid shaft between the spindle 200 and the spindle 420, the two will rotate together at the same speed and in the same direction as measured with respect to the path of feed of the wire passing through them. In an alternative, synchronizing means may comprise a gear train connected between the wire feed rotatable spindle 420 and the rotatable spindle 200 of the bore build-up unit.

As shown most clearly in FIG. 10, the torsionally rigid hollow flexible shaft 480 includes the internal conduit liner 260. The liner is comprised of a spirally wound round wire of metal forming a non-compressible hollow flexible structure. On the outside of this liner are placed three outer layers of spirally wound wire casings 261, 262, 263. Each casing is separately comprised of four round wires wound as a set over a mandrel. The internal diameter of the first casing 261 in its relaxed state is made slightly smaller than the outside diameter of the preformed conduit liner 260 by using a mandrel of appropriate size. The first layer defined by casing 261 is assembled onto the conduit liner 260 by holding the opposite ends of the casing and turning them in an untightening direction. This enlarges the inside diameter of the casing and permits insertion of the liner 260. This combined structure 260, 261 is then inserted into the next casing 262 by similarly turning the latter in an untightening direction. Casing 262 is made with an internal diameter slightly less than the outside diameter of the assembled inner liner 260 and casing 261. This procedure is then followed to insert the combined structure 260, 261, 262 into the casing 263 which itself has been previously constructed with a preformed internal diameter slightly less than the outside diameter of the assembled inner liner and casings 261 and 262.

In assembling the casings 260–263, each one is secured onto the immediately underlying one with the lay of the wires opposite each other. This increases the resistance of the combined structure to torsional twisting. Also, the radial tightness of each casing on the underlying casing holds them together. The composite casing becomes a torsionally rigid yet flexible hollow shaft which can be made in lengths long enough to permit placement of the wire feed device at a location remote enough from the weld build-up unit.

In order to contain the shaft during rotation, it is placed within a tubular casing 482 shown in FIG. 11. The casing is desirable for situations where the shaft 480 must be long and exposed to entanglement during its rotation. Each end of the casing 482 is provided with an end fitting 483, 484. The fittings are constructed to slip over shaft end fittings 485, 486 fixed to the opposite ends of the shaft 480. The fittings 483, 484 of the casing are rotatably mounted on the shaft fittings 485, 486. The shaft end fittings, are, in turn, fixed tightly to the wire feed assembly 440 and the spindle 200, respectively, by suitable connections. Even though the casing is not secured against rotation, it does not rotate as the shaft 480 rotates.

Turning of the wire feed assembly as described above is necessary due to the desire to synchronize the two units, the bore build-up unit and the wire feed unit, to make them behave as if they were on a common rotating shaft, that is, as if the wire feed unit were inverted and placed on the end of the rotatable spindle at the power connector.

Wire from the wire feed unit 400 communicates with weld nozzle 12 in the following manner. The wire feed roll assembly 440 draws welding wire 411 from the wire reel 410 and forces it into and on through inner conduit liner 260 of the torsionally rigid hollow flexible shaft 480 which directs the welding wire into the flexible conduit liner 240 of the rotatable spindle 200 (FIG. 7). The wire then passes through the offset adjustment means member 100 (FIG. 6a) through the inner conduit 21 of the orbital welding torch 10 and finally into communication with weld nozzle 12.

Essential to operation of the welding apparatus of the present invention are the wire and main rotatable spindle which retain the electrical potential applied to them by the external power sources even when the body of the welding apparatus is grounded. Referring again to FIG. 3, to electrically isolate the main rotatable spindle 220 from the body of the welding apparatus, the bearings 222 in the ends of quill 220 are of non-conductive material to electrically insulate the spindle from the quill. Referring to FIG. 2, to electrically isolate the wire rotatable spindle 420 from the horizontal plate 620 on the wire feed device mounting platform, a layer of insulating material 621 is sandwiched between the outside surface of bearing block 622 and horizontal plate 620.

When considering the totally different concepts regarding the design and location of the components of my invention, it becomes evident that it is possible to build the described small, lightweight, completely portable bore build-up machine, utilizing both a remotely located wire feed assembly and remotely located control panel. Such an apparatus and can be carried to the work site by one man and attached to the work by a magnetic base or by mechanical clamping means. There are very few restrictions in using this invention due to its extremely small size. The apparatus can be less than 18" tall and have virtually nonexistent requirements for radial clearance, as the only orbiting component need be the nozzle. Using this same concept one could easily construct a bore welding apparatus resembling a dentist drill, a slim basically cylindrical wand with all drive motors, controls, and bulky components placed at another location away from the weld site where space, or clearance is not at such a premium. It is evident that this would be difficult with prior art apparatus due to the necessity of all the welding apparatus, except for the power source and the control panel, being located at the weld site. It is the aspects claimed in my invention that make it possible to prevent this entanglement while at the same time putting the necessary cumbersome apparatus at a remote site without entanglement of the various connecting control cables, power lines, welding wire and gas hose.

The welding apparatus has been found to produce high quality weld deposits with excellent penetration. The apparatus may be used to resurface the interior of any diameter hollow structure as well as lay a layer of weld material to the external surface of any pipe or shaft of constant or varying radius.

It is evident that numerous alternatives, of the above preferred embodiments will be apparent to those skilled in the art in light of the foregoing descriptions. For example, with respect to the remote wire feed device unit of the present invention, such alternatives may include a stationary version in which the wire feed rotation spindle is mounted integrally to the quill positioner and spindles synchronized in rotation with a gear train. No torsionally rigid flexible shaft would be necessary in that embodiment, but merely a cased flexible conduit liner to direct welding wire into the rotatable spindle. Alternately, where there is ample vertical clearance it would be unnecessary to have the wire feed spindle inverted. The wire feed rotatable spindle could be eliminated by placing the wire feed roll assembly with the spool bracket 415 attached directly on the end of the rotatable spindle.

Figure 8:
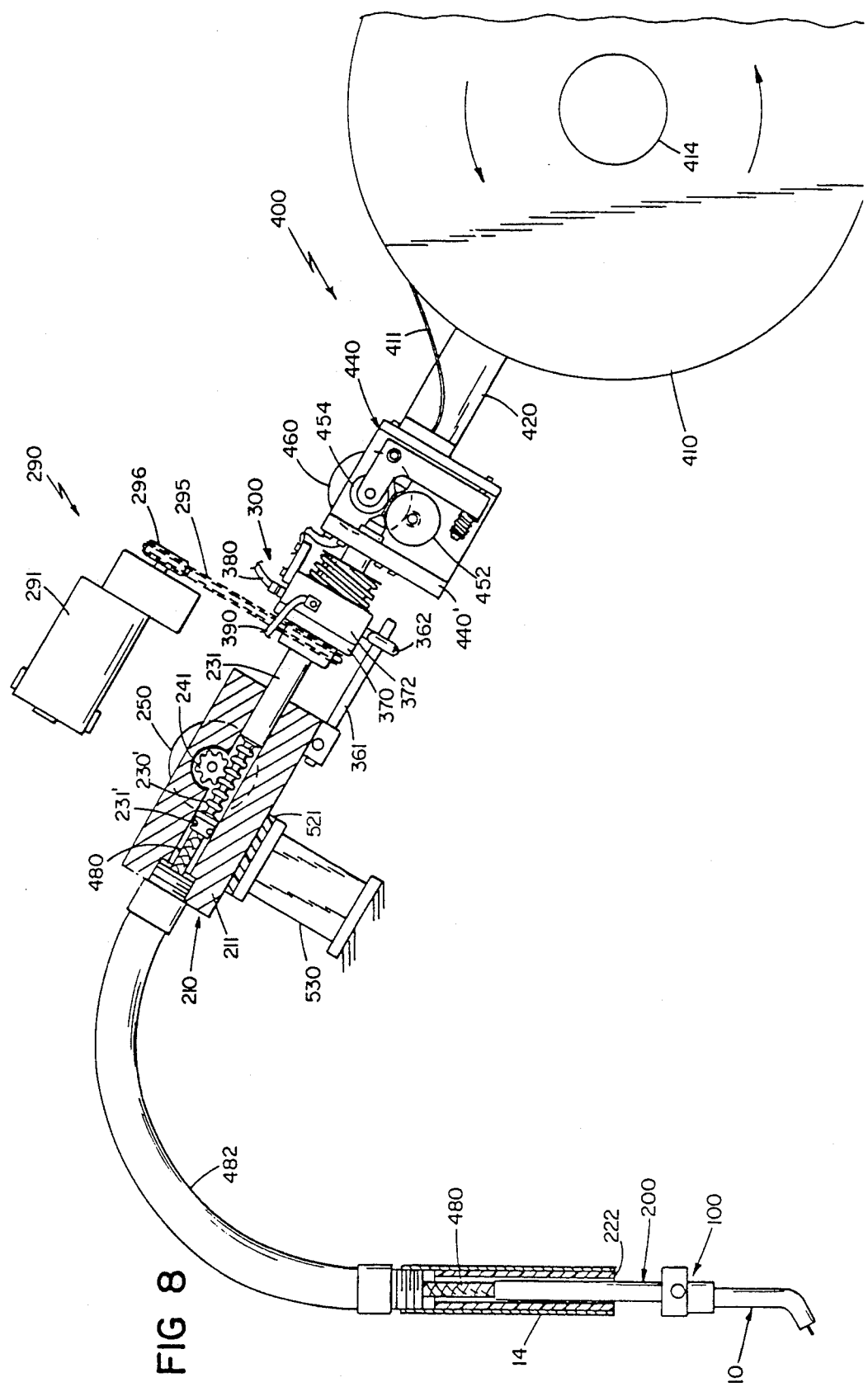
FIG. 8 is a side view of a further embodiment of a portable welding apparatus of the present invention with the quill feeding device, rotation motor, rotatable power connector and wire feed device all remotely located from a weld site.

With respect to the bore build up unit of the present invention, such alternatives may include an apparatus as shown in FIGS. 8 and 8a which depicts a slender welding wand whose body is capable of slipping into still smaller, less accessible holes than the previously described embodiments. In this version, the torsionally rigid hollow flexible shaft 480 is used for axial placement as well as rotational movement of the spindle 200. This allows for the placement of a quill positioner 210 and its gear train (not shown), step-up motor 250, rotatable power connector 300 with its power and gas connections, 390 and 380 respectively, drive motor 291 as well as wire feed device 400 to the other end of the flexible shaft. Thus, all that is left at the weld site is a rotatable spindle 200, a miniature offset adjustment means 100 and orbital welding torch 10 with the adjustment means 100 and orbital welding torch 10 with the spindle 200 supported in electrically insulated bushings 222 within a sheath 14, in and out of which it telescopes. Shaft 231, (taking the place of the quill 220 in the previously described embodiment) is positioned in the quill housing 211 and is machined with grooves 230,, resembling gear teeth, around its circumference through its midsection as shown. These grooves take the place of the rack 230 in the original embodiment of FIG. 3. A pinion 241 is fixed on shaft of step-up gear motor 250 and is in mesh with these teeth on shaft 231. As step-up motor 250 is activated, the pinion 241 shown), step-up motor 250, rotatable power connector 300 with its power and gas connections, 390 and 380 respectively, drive motor 291 as well as wire feed device 400 to the other end of the flexible shaft. Thus, all that is left at the weld site is a rotatable spindle 200, a miniature offset adjustment means 100 and orbital welding torch 10 with the adjustment means 100 and orbital welding torch 10 with the spindle 200 supported in electrically insulated bushings 222 within a sheath 14, in and out of which it telescopes. Shaft 231, (taking the place of the quill 220 in the previously described embodiment) is positioned in the quill housing 211 and is machined with grooves 230,, resembling gear teeth, around its circumference through its midsection as shown. These grooves take the place of the rack 230 in the original embodiment of FIG. 3. A pinion 241 is fixed on shaft of step-up gear motor 250 and is in mesh with these teeth on shaft 231. As step-up motor 250 is activated, the pinion 241 turns forcing shaft to move axially in housing 211.

The flexible shaft 480 is fixedly connected at its one end to shaft 231 and at its other end to rotatable spindle 200. Thus, any axial movement of shaft 231 will produce a corresponding axial movement of rotatable spindle 200 in its sheath 14, producing step-up of the weld nozzle. Shaft 231 has a hole drilled through its center as does the rotatable spindle 200, just as in the previously described embodiment shown in FIG. 3. The flexible shaft 480 also acts as the electrical conduit for the welding power. In addition, the space between the flexible shaft 480 and outer casing 482 provides enough clearance for passage of gas to the orbital welding torch. Gas enters this space from outlet holes 231' in the shaft 231.

The grooves 230' in shaft 231 allow drive motor 291 to rotate shaft 231 in the quill housing 211. This rotation is transferred by way of the flexible shaft 480 to the rotatable spindle and thus to the orbital welding torch. Electrical insulation 521 is sandwiched between housing 211 and mounting bracket 530 to achieve electrical isolation of the housing 211 to the base. This mounting bracket 530 can be of any configuration depending upon the requirements.

Slip ring assembly 700, shown most clearly in FIG. 8a, comprises flat rings 721 and 723 which are mounted on the end of the non-conductive housing end plate 441' of the wire feed housing 440. Copper spring brushes 721 and 723 held by housing 372 through non-conductive holder 724, transfer electrical power to the wire feed motor 460 via wires 721' and 723'.

The welding wand in FIG. 8 need not be held nor clamped in position. It is merely slipped into the hole to be welded using bushings around its outside to center if necessary. Flexible shaft casing 482, being axially rigid, holds the wand sheath 14 in position and the rotatable spindle slips in and out of the sheath as desired for fine axial placement as well as for step-up. The casing 482 is also torsionally rigid so it holds sheath 14 from rotating.

The construction of the welding apparatus with the wire held against rotation is shown in FIGS. 12-14. The apparatus differs from the embodiment shown, for example in FIG. 3, in the construction of the remote wire feed device and in its connection to the back end of the welding spindle.

As shown in FIG. 12, the wire reel 410 containing the spool of welding wire electrode 411 is fixed to a common support 800 with the wire feed roll assembly 440. The support is fixed relative to ground. This differs from the embodiment shown in FIG. 3 where the wire reel rotates about the axis of the wire relative to the wire feed roll assembly 440.

In addition, the embodiment of the invention shown in FIG. 12 includes a wire straightening mechanism 802 disposed between the wire reel 410 and the wire feed roll assembly 440'. The wire straightening mechanism is also mounted on the support 800. In construction, it includes three rolls 803, 804, 805. The first two rolls 803 and 804 are disposed along the path of feeding of the wire between the supply reel and the wire feed roll assembly with each roll being in engagement with the wire on one side thereof. The third roll 805 is disposed between the first and second rolls on the other side of the wire. The third roll is laterally aligned with respect to the first and second rolls 803, 804 to push the wire laterally of its path of feed from engagement with the roll 803 to its engagement with the roll 804. This operation has the effect of straightening the wire into a relaxed liner configuration, that is, one with no tendency to coil or curve in the relaxed state.

After passing through the wire straightening mechanism 802, the wire feed roll assembly 440' feeds the straightened wire in the axial direction toward the welding spindle of the apparatus. In construction, the wire feed roll assembly includes a pair of rolls 452', 454' of the same construction as with the embodiment of FIG. 3. Due to the fact that the wire feed roll assembly 440' is fixed relative to the wire reel 410, the slip ring construction of FIG. 3 is no longer necessary.

The conduit between the non-rotating wire feed unit and the welding spindle of the apparatus is a standard conduit liner encased within a protective covering such as an air hose 807. A third outer casing 808 is provided to control the bending of the wire as it is fed from the wire feed unit to the welding unit. In this regard, it is important that the bending not be so great that it induces a permanent bend or curve back into the straightened wire. Accordingly, the outer casing 808 is constructed with a minimum bending radius to thus limit the amount of bending to which the welding wire can be subjected. This minimum bending radius is greater than that which will cause permanent bending of the wire passing therethrough.

Since the wire feed unit is not rotating the wire relative to the welding spindle, it is necessary to provide a rotative coupling to the input end of the welding spindle. This coupling is shown most clearly in FIG. 13. The welding spindle 200 is identical in construction to the embodiment shown in FIGS. 3 and 7, except for the fact that the end receiving the wire from the wire feed unit is provided with a male threaded section 809 rather than the female threaded section as shown in FIG. 7. A pair of ball bearings 810, 811 have their outer races secured in a holder 812. The holder, in turn, is internally threaded at 813 for attachment to the threaded end section 809 of the welding spindle 200'. A small spindle 814 is press fit into the bearings, the inner races thereof seating on the surface 815 of the spindle. A section of conduit liner 806 is provided inside the small spindle. Also, at the input end of the small spindle there is a transitional opening 816. This opening is funnel-shaped so as to guide the welding wire into the conduit liner 806. Similarly, a transitional fitting 817 is provided in the welding spindle 200' adjacent the threaded end section 809 for guiding the welding wire into the internal conduit liner 240. This conduit liner is the same as that shown in the embodiment in FIG. 7.

To effect the connection of the wire feed conduit assembly 806-808 coming from the wire feed unit of FIG. 12, a fitting 818 (FIG. 13) is provided. This fitting includes a first part 819 which is fixed to the end of the conduit liner 06 where it exits from the protective covering 807. This part 819 is coupled to a threaded part 820 which is adapted to thread onto the threaded back end 821 of the small spindle.

With the above coupling connection, the welding spindle rotates freely with the outer races of the ball bearings 810, 811 relative to the inner races thereof and the non-rotating wire feed unit. Further, in this construction the welding wire 411 will remain fixed against rotation as it passes through the welding spindle 200, and out the end of the welding nozzle 12' of the orbital welding torch 10'.

The internal construction of the welding nozzle is the same as with the other embodiments of the invention; and as shown in FIG. 14, engagement of the welding wire 411 with the inner wall surface 822 of the nozzle causes it to bend. This is so because the nozzle 12' extends at an angle to the longitudinal axis of the welding spindle 200'. This engagement of the wire along the inner wall surface of the nozzle will place a torsional load on the section of wire before the nozzle and rotate the wire within the nozzle due to the rotational forces acting on it by the rotating nozzle. This rotational or torsional force acting on the wire may tend to cause it to twist. With the present invention, any tendency in this respect is overcome by continuously feeding the wire at a linear speed which is great enough to prevent any build-up of torsional rotative forces acting on the wire. In other words, the wire at any point along its length does not remain in the rotating welding nozzle long enough to permit any build-up of such torsional forces. With this construction, the wire exits from the welding nozzle in a constant uniform position with respect to the exit and thus with respect to the workpiece.

FIG. 9 shows a weld layer 20 comprising circular weld beads 22, 32, and 42 along an outer surface of a metal tube 50 deposited in accordance with the preferred method of the present invention. The step-up welding of weld layer 20 begins with the orbital welding torch (not shown) depositing circular weld bead 22 and ends with the orbital welding torch depositing circular weld bead 42. The path traversed by the orbital welding torch in depositing circular weld bead 22 begins at limit point 26 along phantom line b—b, continues 360° back to limit point 26 and, during stepping between the limit point 26 to the phantom line c—c, continues to point 34 where circular weld bead 32 starts. In effecting weld deposit 22, the orbital welding torch is continuously rotated in a circular path from limit point 26 back to limit point 26, a rotation equal to about 360°. At the same time, electrical power and welding wire are provided. The welding wire is supplied from the wire feed device which is also being rotated in synchronization with the rotation of the welding torch or held stationary with the wire instead being straightened into a relaxed linear configuration. After this first stepping, the torch continues rotating in a circular path in an amount slightly less than 360°, from point 34 along phantom line c—c to a limit point 36 along phantom line b—b. Subsequently, the torch is stepped in the same manner as previously described in connection with weld bead 22, to a position contiguous to weld bead 32, for depositing weld bead 42. Weld bead 42 is then deposited by a 360° rotation of the orbital welding torch from starting point 46 along phantom line b—b to limit point 44 along phantom line c—c. In an actual welding procedure, weld bead 22 would be at the bottom of the tube 50 and weld bead 42 at the top edge with a number of intermediate beads 32 as required.

Both the distance between each limit point along phantom line b—b of each weld bead and the corresponding limit point along phantom line c—c of each contiguous weld bead and the speed that the welding apparatus steps from one weld bead to a contiguous weld beads are parameters programmed by an operator into the control panel (not shown). With no discontinuities in the welding operation at the point of step-up, a continuous weld is effected by the method of the present-invention which is of uniform high quality throughout. Consequently, the welding using the present invention minimizes stress failures usually incident to discontinuous operation of a welding apparatus at the point of step-up.

Additionally, with respect to weld build-up, since step-up occurs only during a specified time interval during completion of each circular weld, the circular weld deposits made by the orbiting welding head as it traverses a metal object remains essentially perpendicular to the axis of the bore. That is, the plane in which each circular weld bead lies is perpendicular to the longitudinal axis of the cylindrical object being worked on. If the weld bead were to travel in a helical pattern, as a continuous gradual feed in conjunction with rotation would produce, a circumferential triangular wedge would be left unwelded at the beginning and the end of each bore being welded. This is unsatisfactory in most cases. Neither should one return to the unwelded portion to fill in the void. In bore build-up welding it is desirable to complete the operation, once started, without breaking the electric arc as each successive bead tempers the preceding bead and preheats the path to be followed by the next weld bead helping to relieve stresses and reduce hard spots, leaving a homogeneous weld surface uniform in hardness and grain size. Having the plane of the weld bead perpendicular to the axis of the bore eliminates the unwelded wedge and the necessity of going back to fill in the unwelded portion.

While the above invention has been described in conjunction with specific embodiments, it is evident that numerous alternatives, modifications and variations will be apparent to those skilled in the art in view of the foregoing description.

While I have described a form of my invention utilizing an offset adjustment means, the invention contemplates a welding apparatus which does not include an offset adjustment means. Adjustment would be accomplished by interchanging different torches. Also while the foregoing description refers to step-up operation, the apparatus contemplates effecting a helical weld bead instead of intermittent step-up if desired by merely operating the step-up means continuously.

It should also be apparent that step-up need not be electrical but instead could be mechanical, such as a ratchetting means that could be operated by revolution of the rotatable spindle stepping the torch to the next weld circle, or such as a continuously rotating screw to form a helical bead.

I claim:

1. Welding apparatus for weld build-up on a surface of revolution, comprising:
   an elongated, rotatable assembly that supports, at one end, an electrical welding torch that terminates in a nozzle,
   said rotatable assembly being adapted to introduce electrical welding current, inert gas, and welding wire to the torch,
   characterized in that
   said assembly comprises an electrically conductive, hollow, metal drive spindle,
   means are provided for both applying driving motion and conducting electrical current by said metal drive spindle for transmission to the torch, and
   means are provided for passage of gas and welding wire through said current-carrying spindle to the torch,
   said means for conducting electrical current to said drive spindle comprising a rotatable power connector comprising first and second metal housings and first and second current-conductive washers; said first housing being fixedly attached to said spindle, said second housing being provided with an electrical power conduit, said first washer being fixedly attached to said first housing, said second washer being fixedly attached to said second housing, and both said second washer and said second housing being slipped over a stem of said first housing; said housings and said washers providing said rotatable power connector with electrical power transmission means.

2. The welding apparatus of claim 1 wherein the second washer lies contiguous to the first washer and is held in sliding contact to said first washer by a securing means.

3. The welding apparatus of claim 1 wherein the power connector further comprises:
   (a) a stem portion extending axially form the second housing said first housing and in encircling relationship with said spindle to define a first annular chamber between the stem portion and spindle; and
   (b) slidable electrical contact surfaces fixed to said housings and in axial electrical conducting engagement with each other at a location radially outward of said stem portion, said housings being axially spaced from each other between said stem portion and the electrical contact surfaces to define a second annular chamber.

4. The welding apparatus of claim 1 wherein the rotatable power connector is made of a solid bronze.

5. The welding apparatus of claim 1 where the rotatable power connector is attached about said rotatable drive spindle, leaving said first end of the spindle free for entrance of welding wire and inert gas.

6. The welding apparatus of claim 1 wherein said rotating powder connector comprises torque resisting means including an eyescrew attached to an external surface of the second housing for receiving and holding a torsional resistance bar that is attached to a stationary surface.

7. The welding apparatus of claim 1 wherein said securing means comprises a spring through ball thrust bearing.

* * * * *

UNITED STATES PATENT AND TRADEMARK OFFICE
CERTIFICATE OF CORRECTION

PATENT NO. : 4,873,419

DATED : October 10, 1989

INVENTOR(S) : Rees H. Acheson

It is certified that error appears in the above-identified patent and that said Letters Patent is hereby corrected as shown below:

REFERENCES CITED

"4,242,987  1/1981 Bernard et al." should be --4,242,981 1/1981 Bernard et al.--.

Col. 1, line 23, "welding area" should be --welding area.--.

Col. 1, line 34, "application" should be --application.--.

Col. 1, line 36, "service" should be --service,--.

Col. 2, line 43, "clearances" should be --clearances.--.

Col. 3, line 27, "field" should be --field.--.

Col. 5, line 52, "rottable" should be --rotatable--.

Col. 6, line 16, "platform" should be --platform.--.

Col. 8, lines 52-53, delete "assembled adjustment means shown in FIG. 4;".

Col. 8, line 59, "FIG. 5a" should be --FIG. 5e--.

Col. 8, line 61, "FIG. 6 an" should be --FIG. 6a is an--.

Col. 11, line 16, "146,," should be --146',--

Col. 12, line 41, "site" should be --site.--.

Col. 12, line 48, "portion 370," should be --portion 370'--.

UNITED STATES PATENT AND TRADEMARK OFFICE
CERTIFICATE OF CORRECTION

PATENT NO. : 4,873,419

DATED : October 10, 1989

INVENTOR(S) : Rees H. Acheson

It is certified that error appears in the above-identified patent and that said Letters Patent is hereby corrected as shown below:

Col. 13, line 55, "shaft 241,," should be --shaft 241',--.

Col. 14, line 9, "each 360" should be --each 360°--.
Col. 14, line 66, "42" should be --423--.
Col. 14, line 67, "wires 421, and 423," should read --wires 421' and 423'.--.

Col. 18, line 2, "groves 230,," should be --grooves 230',--.

Col. 18, lines 9-29, delete "shown), step-up motor 250, ... actovated, the pinion 241".

Col. 19, line 13, "roll assembly 440," should read --roll assembly 440'.--.

Col. 19, line 68, "The welding spindle 200" should be --The welding spindle 200'--.

Col. 20, line 27, "conduit liner 06" should be --conduit liner 806--.

Col. 20, line 37, "welding spindle 200," should be --welding spindle 200'--.

UNITED STATES PATENT AND TRADEMARK OFFICE
CERTIFICATE OF CORRECTION

PATENT NO. : 4,873,419

DATED : October 10, 1989

INVENTOR(S) : Rees H. Acheson

It is certified that error appears in the above-identified patent and that said Letters Patent is hereby corrected as shown below:

Col. 21, line 45, "sent-invention" should be --sent invention--.

Col. 23, line 4, "form" should be --from--.

Col. 23, line 5, insert the word --through-- before "said first housing".

Col. 23, line 10, "electrical" should be --electricity--.

Signed and Sealed this

Eighteenth Day of December, 1990

Attest:

HARRY F. MANBECK, JR.

Attesting Officer

Commissioner of Patents and Trademarks